(12) United States Patent
Lee et al.

(10) Patent No.: US 10,411,515 B2
(45) Date of Patent: Sep. 10, 2019

(54) PRIMARY COIL CIRCUIT FOR WIRELESS POWER TRANSFER, GROUND ASSEMBLY USING THE SAME, AND MANUFACTURING METHOD THEREFOR

(71) Applicants: Hyundai Motor Company, Seoul (KR); Kia Motors Corporation, Seoul (KR); Research & Business Foundation Sungkyunkwan University, Suwon, Gyeonggi-do (KR)

(72) Inventors: Woo Young Lee, Gyeonggi-do (KR); Gyu Yeong Choe, Gyeonggi-Do (KR); Min Jung Kim, Gyeonggi-Do (KR); Min Kook Kim, Gyeonggi-Do (KR); Jong Eun Byeon, Gyeonggi-Do (KR); Min Hyuck Kang, Gyeonggi-Do (KR); Dong Gyun Woo, Gyeonggi-Do (KR); Byoung Kuk Lee, Gyeonggi-Do (KR); Dong Myoung Joo, Gyeonggi-Do (KR)

(73) Assignees: Hyundai Motor Company, Seoul (KR); Kia Motors Corporation, Seoul (KR); Research & Business Foundation Sungkyunkwan University, Suwon, Gyeonggi-do (KR)

( * ) Notice: Subject to any disclaimer, the term of this patent is extended or adjusted under 35 U.S.C. 154(b) by 165 days.

(21) Appl. No.: 15/460,825

(22) Filed: Mar. 16, 2017

(65) Prior Publication Data
US 2017/0279309 A1  Sep. 28, 2017

(30) Foreign Application Priority Data
Mar. 24, 2016 (KR) .................. 10-2016-0035187

(51) Int. Cl.
*H02J 50/12* (2016.01)
*H02J 50/90* (2016.01)
(Continued)

(52) U.S. Cl.
CPC .............. *H02J 50/12* (2016.02); *B60L 53/12* (2019.02); *B60L 53/14* (2019.02); *H01F 38/14* (2013.01);
(Continued)

(58) Field of Classification Search
CPC . H02J 50/80; H02J 7/025; H02J 50/12; B60L 11/182; B60L 11/1816; H01F 38/14
See application file for complete search history.

(56) References Cited

U.S. PATENT DOCUMENTS 9,787,141 B2   10/2017  Karalis et al.
2008/0231373 A1*  9/2008  Rahman .................. H01L 23/66
                                                                    330/302
(Continued)

FOREIGN PATENT DOCUMENTS

KR   10-2014-0053282 A   5/2014

OTHER PUBLICATIONS

Liu, Nan, "Design of a Universal Inductive Charger for Multiple Electric Vehicle Models", IEEE Transaction on Power Electronics, Vo. 30, No. 11 (Nov. 2015) pp. 6378-6390.

*Primary Examiner* — Jared Fureman
*Assistant Examiner* — Duc M Pham
(74) *Attorney, Agent, or Firm* — Mintz Levin Cohn Ferris Glovsky and Popeo, P.C.; Peter F. Corless

(57) ABSTRACT

A primary coil circuit of a ground assembly for wirelessly transferring power to a secondary coil includes: a primary coil magnetically coupled to the secondary coil and having a first terminal and a second terminal; a second capacitor having a first terminal and a second terminal connected to the first terminal of the primary coil; a first inductor having a first terminal coupled to a first input terminal of a power source and a second terminal coupled to the first terminal of the second capacitor; and a first capacitor having a first
(Continued)

terminal coupled commonly to the second terminal of the first inductor and the first terminal of the second capacitor and a second terminal coupled commonly to the second terminal of the primary coil and a second input terminal of the power source.

15 Claims, 13 Drawing Sheets

(51) Int. Cl.
> *H01F 38/14* (2006.01)
> *H02J 7/02* (2016.01)
> *B60L 53/14* (2019.01)
> *B60L 53/12* (2019.01)
> *H02J 50/80* (2016.01)

(52) U.S. Cl.
> CPC .............. *H02J 7/025* (2013.01); *H02J 50/90* (2016.02); *H02J 50/80* (2016.02)

(56) References Cited

U.S. PATENT DOCUMENTS

| | | | |
|---|---|---|---|
| 2009/0045884 A1* | 2/2009 | Kishimoto | ................ H01P 1/36 |
| | | | 333/24.2 |
| 2013/0020878 A1* | 1/2013 | Karalis | ................... H02J 7/025 |
| | | | 307/104 |
| 2017/0310162 A1* | 10/2017 | Matsumoto | ............. H02J 50/05 |

* cited by examiner

FIG. 17

| resonant diagram | series | parallel | parallel | series | series parallel | series parallel |
|---|---|---|---|---|---|---|
| Secondary coil Circuit | | | | | | |
| Air gap | | | | | | |
| Primary coil Circuit | | | | | | |
| | series | parallel | series | parallel | series parallel | parallel |

PRIMARY COIL CIRCUIT FOR WIRELESS POWER TRANSFER, GROUND ASSEMBLY USING THE SAME, AND MANUFACTURING METHOD THEREFOR

CROSS-REFERENCE TO RELATED APPLICATION

This application claims the benefit of priority to Korean Patent Application No. 2016-0035187 filed on Mar. 24, 2016 in the Korean Intellectual Property Office (KIPO), the entire contents of which are hereby incorporated by reference as if fully set forth herein.

TECHNICAL FIELD

The present disclosure relates generally to wireless power transfer technology, and more particularly, to a primary coil circuit for wireless power transfer, a ground assembly using the same, and a manufacturing method for the same.

BACKGROUND

Electric vehicle (EV) wireless power transfer is a technique of transferring power from a power supply unit connected to a power source to an electric load of an EV through a magnetic field. Resonance circuits of various circuit topologies may be used to transfer wireless power between the power supply unit and the EV.

In a conventional resonance circuit example, a structure (hereinafter, referred to as "Series-Series (SS) structure") includes a primary-side compensation capacitor $C_P$ connected in series with a primary coil $L_P$ and a secondary-side compensation capacitor $C_S$ connected in series with a secondary coil $L_S$ to compensate for inductance, as shown in FIG. 1. A wireless power transfer (WPT) system using the above-described SS circuit topology has the simplest capacitor design since the compensation capacitors are connected in series in each of the primary and secondary coil sides. However, the system is inadequate for battery charging since it exhibits current source output characteristics.

For example, as shown in FIGS. 2 and 3, a 3.3 kW conventional WPT system designed at a resonance frequency of 85 kHz exhibits a constant current ($I_O$) characteristic at the corresponding frequency. The system may have a problem in which the phase φ of the input impedance $Z_{in}$ is inverted due to the bifurcation phenomenon under light-load (e.g., 0.41 kW).

Also, as shown in FIG. 4, another conventional WPT system may have a structure (hereinafter, referred to as "Series-Parallel (SP) structure") in which the primary-side compensation capacitor $C_P$ is connected in series with the primary coil $L_P$ and the secondary-side compensation capacitor $C_S$ is connected in parallel with the secondary coil $L_S$. A WPT system using the SP circuit topology exhibits a constant voltage ($V_O$) characteristic, and thus the problem of controlling the output voltage ($V_O$) can be resolved. However, the bifurcation phenomenon in which the shape of the phase curve changes according to the operating frequency, depending on the design, causes the stability of the entire system to deteriorate, causing the control to become difficult, and making the system design very difficult.

For example, as shown in FIGS. 5 and 6, a 3.3 kW conventional WPT system designed at a resonance frequency of 85 kHz exhibits a constant voltage characteristic at the corresponding frequency and is suitable for battery charging. However, similar to the SS circuit topology, the bifurcation phenomenon may occur at a light-load (e.g., 0.41 kW), which is inadequate for light-load operation.

Also, as shown in FIG. 7, yet another conventional WPT system may have a structure (hereinafter, referred to as "Inductance-Capacitance-Inductance-Series (LCL-S) structure") in which an LC resonance circuit having an inductor $L_{in}$ connected in series to the primary coil $L_P$ and a capacitor $C_P$ connected in parallel to the primary coil is connected to the primary coil $L_P$, and a compensation capacitor $C_S$ is connected in series to the secondary coil $L_S$. A WPT system using the LCL-S circuit topology exhibits a constant voltage output characteristic and exhibits a bifurcation-resistant characteristic as compared to the SS or SP circuit topology. However, the inductance value of the primary coil $L_P$ for satisfying output power and voltage conditions is relatively small. Therefore, the WPT system using the LCL-S circuit topology has a drawback in that the system design is difficult due to a very large primary-side coil current.

SUMMARY

Accordingly, embodiments of the present disclosure are provided to substantially obviate one or more problems due to limitations and disadvantages of the related art.

Embodiments of the present disclosure provide a wireless power transfer system that is robust to bifurcation under light-load and can reduce primary coil current.

Embodiments of the present disclosure also provide a circuit topology of a wireless power transfer system that is robust to bifurcation under light-load and can reduce primary coil current.

Embodiments of the present disclosure also provide a wireless power transfer primary coil circuit that is robust to bifurcation under light-load and can reduce primary coil current.

Embodiments of the present disclosure also provide a ground assembly using a wireless power transfer primary coil circuit that is robust to bifurcation under light-load and can reduce primary coil current.

Embodiments of the present disclosure also provide a manufacturing method of a ground assembly using a wireless power transfer primary coil circuit that is robust to bifurcation under light-load and can reduce primary coil current.

According to embodiments of the present disclosure, a primary coil circuit of a ground assembly for wirelessly transferring power to a secondary coil includes: a primary coil magnetically coupled to the secondary coil and having a first terminal and a second terminal; a second capacitor having a first terminal and a second terminal connected to the first terminal of the primary coil; a first inductor having a first terminal coupled to a first input terminal of a power source and a second terminal coupled to the first terminal of the second capacitor; and a first capacitor having a first terminal coupled commonly to the second terminal of the first inductor and the first terminal of the second capacitor and a second terminal coupled commonly to the second terminal of the primary coil and a second input terminal of the power source.

A first inductance of the first inductor may be smaller than a second inductance of the primary coil.

The first inductance may be calculated by multiplying the second inductance of the primary coil and a value obtained by dividing a second capacitance of the second capacitor by a sum of a first capacitance of the first capacitor and the second capacitance of the second capacitor.

The second capacitance of the second capacitor may be determined by a target current supplied to the primary coil.

A phase of a current flowing through the primary coil may be 90 degrees different from a phase of a current flowing through the first inductor.

A first resonance frequency of a first resonance circuit formed by the first inductor and the first capacitor may be equal to a second resonance frequency of a second resonance circuit formed by the primary coil and the second capacitor.

The primary coil circuit may further include at least one third capacitor connected in parallel to the second capacitor.

The primary coil circuit may further comprise at least one switching element connected in series to the at least one third capacitor include the second capacitor. The at least one switching element may be turned on or off by a ground assembly controller connected to the at least one switching element.

Furthermore, in accordance with embodiments of the present disclosure, a ground assembly for wirelessly transferring power to a secondary coil includes: a primary coil magnetically coupled to the secondary coil and having a series resonance circuit; a second capacitor connected in series with the primary coil; and a parallel resonance circuit coupled to the series resonance circuit of the primary coil and the second capacitor and having a first inductor and a first capacitor.

The ground assembly may further include a power conversion unit which is coupled to the parallel resonance circuit, converts a power from a power source, and transfers the converted power to the parallel resonance circuit.

The ground assembly may further include a controller controlling a system frequency applied to the parallel resonance circuit by controlling operation of at least one switching element in the power conversion unit.

The controller may control the system frequency so that a first resonance frequency of the parallel resonance circuit is equal to a second resonance frequency of the series resonance circuit.

The controller may control an operating frequency according to element tolerance or an element deterioration of one or more of the primary coil, the second capacitor, the first capacitor, and the first inductor, such that the operating frequency matches or approximates the system frequency, a resonance frequency of the parallel resonance circuit, or a resonance frequency of the series resonance circuit.

The ground assembly may further comprise at least one third capacitor connected in parallel to the second capacitor; at least one switching element connected in series to the at least one third capacitor or the second capacitor; and a controller controlling an ON or OFF operation of the at least one switching element.

Furthermore, in accordance with embodiments of the present disclosure, a method of manufacturing a ground assembly for wirelessly transferring power to a secondary coil includes: forming a primary coil circuit; and connecting a power conversion unit converting a power from a power source and transferring the converted power to the primary coil circuit. The primary coil circuit includes: a primary coil magnetically coupled to the secondary coil and having a first terminal and a second terminal; a second capacitor having a first terminal and a second terminal connected to the first terminal of the primary coil; a first inductor having a first terminal coupled to a first input terminal of the power source and a second terminal coupled to the first terminal of the second capacitor; and a first capacitor having a first terminal coupled commonly to the second terminal of the first inductor and the first terminal of the second capacitor and a second terminal coupled commonly to the second terminal of the primary coil and a second input terminal of the power source. A capacitance of the second capacitor is determined based on a target current applied to the primary coil.

A first inductance of the first inductor may be smaller than a second inductance of the primary coil.

The first inductance may be calculated by multiplying the second inductance of the primary coil and a value obtained by dividing a second capacitance of the second capacitor by a sum of a first capacitance of the first capacitor and the second capacitance of the second capacitor.

A first resonance frequency of a first resonance circuit formed by the first inductor and the first capacitor may be equal to a second resonance frequency of a second resonance circuit formed by the primary coil and the second capacitor.

The primary coil circuit may further include: at least one third capacitor connected in parallel to the second capacitor and at least one switching element connected in series to the at least one third capacitor or the second capacitor. The at least one switching element may be turned on or off by a ground assembly controller connected to the at least one switching element.

The forming of the primary coil circuit may include forming a primary pad including the primary coil and ferrite supporting the primary coil.

Using the wireless power transfer primary coil circuit and the ground assembly using the same according to the embodiments of the present disclosure as described above, robust characteristics against bifurcation under light-load can be obtained, and it is made possible to prevent damage to elements in the circuit.

Further, the primary coil current can be reduced to a reasonable value through the design of the auxiliary filter including the second capacitor or the second capacitor itself, thereby improving system stability and improving controllability while facilitating system design. That is, there is an advantage that the voltage stresses of the primary-side compensation capacitor and the secondary-side compensation capacitor can be distributed at an appropriate ratio. Also, there is an advantage that the operating performance can be maintained coping with element tolerance or deterioration through the second capacitor or the auxiliary filter, thereby increasing the reliability.

In addition, a double resonance circuit in which the LC resonance circuit and the CL resonance circuit are combined in the wireless power transfer primary coil circuit is adopted, and thus the WPT system according to embodiments of the present disclosure can effectively prevent the bifurcation phenomenon that easily occurs under the light-load of the existing system using the SS or SP circuit topology, even in the case of light-load and high coupling coefficient due to the characteristics of the compensation capacitor $C_P$ connected in parallel with the primary coil. Also, as compared with conventional systems, there is an advantage that the inductance value of the primary coil can be reduced.

BRIEF DESCRIPTION OF DRAWINGS

Embodiments of the present disclosure will become more apparent by describing in detail embodiments of the present disclosure with reference to the accompanying drawings, in which:

FIG. 17 is a diagram illustrating exemplary circuit topologies of the WPT system according to embodiments of the present disclosure.

DETAILED DESCRIPTION OF THE EMBODIMENTS

Figure 1:
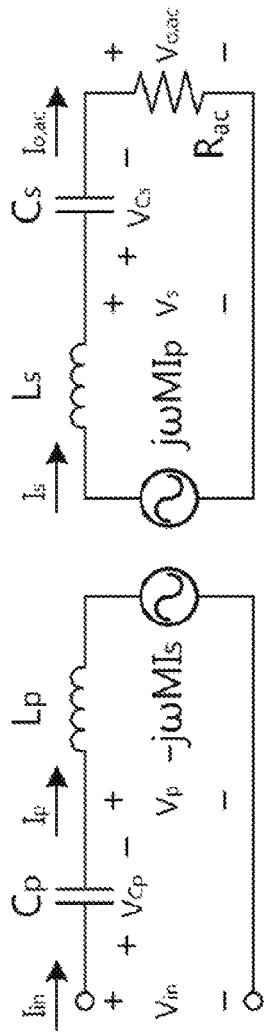
FIG. 1 is a circuit diagram of a major portion of a WPT system having a circuit topology of a SS structure according to a comparative example.
Figure 2:
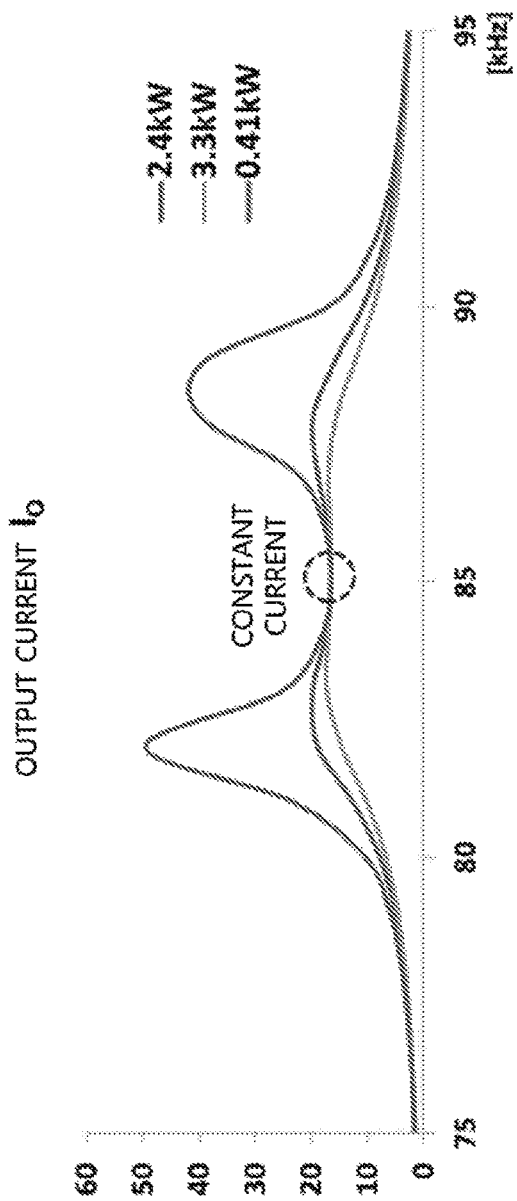
FIG. 2 is a graph illustrating changes in output current according to a frequency change of the WPT system of FIG. 1.
Figure 3:
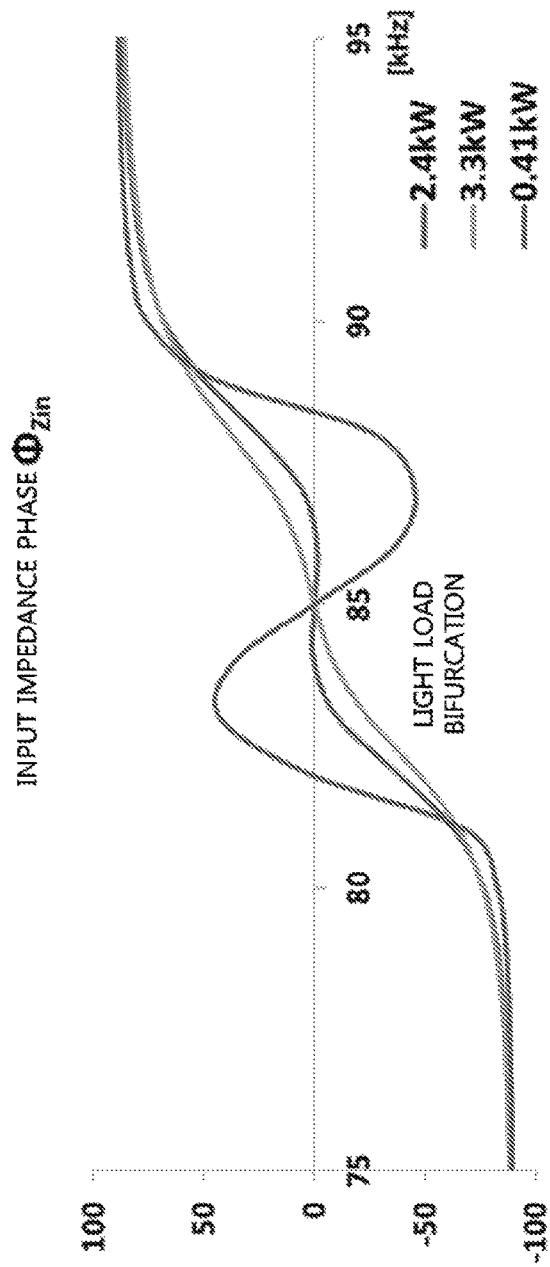
FIG. 3 is a graph illustrating changes in a phase of input impedance according to a frequency change of the WPT system of FIG. 1.
Figure 4:
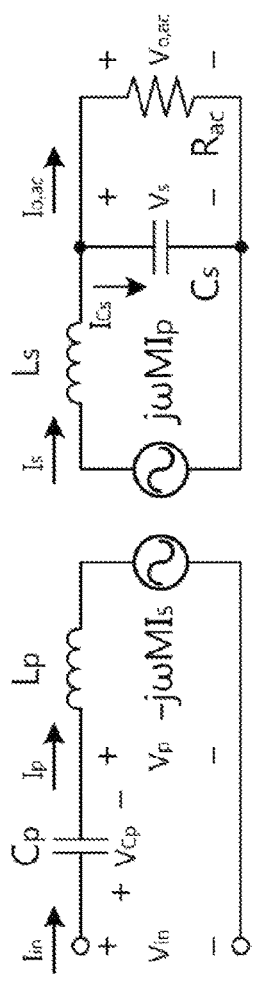
FIG. 4 is a partial circuit diagram of a WPT system having a circuit topology of a SP structure according to another comparative example.

Embodiments of the present disclosure are disclosed herein. However, specific structural and functional details disclosed herein are merely representative for purposes of describing embodiments of the present disclosure. Subject matter of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Plug-in vehicle (PV)": An electric vehicle rechargeable through wireless charging from an electric vehicle supply equipment (EVSE) without using a physical plug or a physical socket.

"Heavy duty vehicle; H.D. Vehicle": Any four- or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically through a two-part loosely coupled transformer.

"Wireless power transfer (WPT)": The transfer of electrical power from the AC supply network to the electric vehicle by contactless means.

"Utility": A set of systems which supply electrical energy and include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which component of a system interwork with corresponding components of the system in order to perform operations aimed by the system. Also, information interoperability may mean capability that two or more networks, systems, devices, applications, or components can efficiently share and easily use information without giving inconvenience to users.

"Inductive charging system": A system transferring energy from a power source to an EV through a two-part gapped core transformer in which the two halves of the transformer, primary and secondary coils are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly (VA)": An assembly on the vehicle consisting of the VA Coil, rectifier/power conversion unit and VA controller as well as the wiring to the vehicle batteries and between each unit, filtering circuits, housing (s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA Coil magnetic surface distance": the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

"Command and control communication": The communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning ad pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which you want to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is installed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

In embodiments according to the present disclosure, the light-load driving or light-load operation may include, for example, charging the high voltage battery with a charging voltage lower than a predetermined rated voltage in the latter half of charging for the high voltage battery connected to the VA in the WPT system. Also, the light-load operation may include a case in which the high-voltage battery of EV is charged at a relatively low voltage and at a low speed by using a low-speed charger such as a household charger.

Hereinafter, embodiments according to the present disclosure will be explained in detail by referring to accompanying figures.

Figure 8:
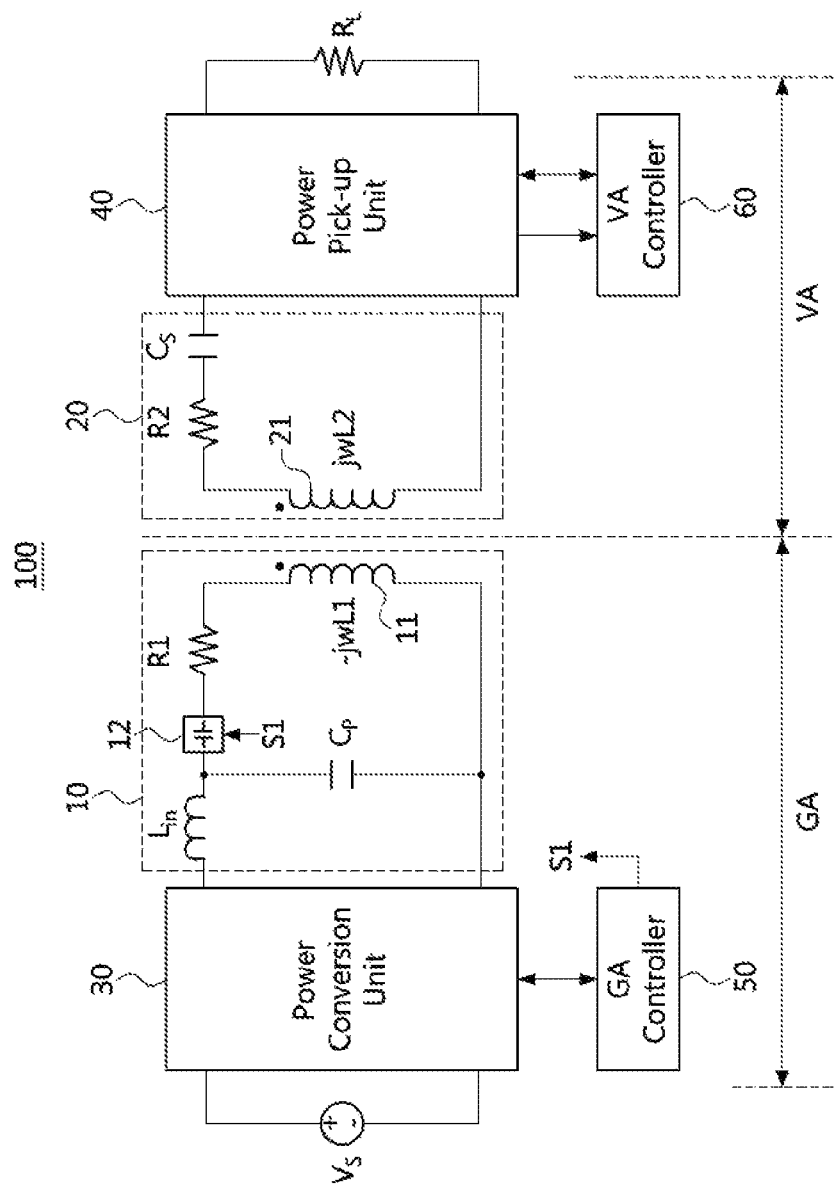
FIG. 8 is a block diagram illustrating a WPT system according to embodiments of the present disclosure.

FIG. 8 is a block diagram illustrating a WPT system according to embodiments of the present disclosure.

As shown in FIG. 8, a wireless power transfer (WPT) system 100 according to embodiments of the present disclosure may comprise a ground assembly (GA) connected to a power source $V_S$ and supplying wireless power to a secondary-side through a primary coil 11, and a vehicle assembly (VA) connected to an electrical load ($R_L$) and receiving the wireless power from the primary-side through a secondary coil 21. The electric load $R_L$ may include a battery (e.g., a high voltage battery) mounted on the EV and supplying driving electric power to the electric motor of the EV.

The GA may comprise a primary coil circuit 10, a power conversion unit 30, and a GA controller 50. The power conversion unit 30 is connected to the power source $V_S$ and has an alternating current (AC) to direct current (DC) converter (AC-DC converter) or an inverter. Also, the power conversion unit 30 may convert the power of the power source under the control of the GA controller 50 and transfer the power to the primary coil circuit 10.

The VA may comprise a secondary coil circuit 20, a power pick-up unit 40, and a VA controller 60. The power pick-up unit 40 is connected to the electric load $R_L$, has a rectifier and a filter, and can distribute electric power to the electric load and the VA controller 60 under the control of the VA controller 60.

Also, the WPT system 100 may include a resonant circuit of LC/CL-S structure. Here, the resonance circuit topology of the LC/CL-S structure is such that the primary coil circuit 10 included in the GA comprises a double resonance circuit in which an LC parallel resonance circuit (i.e., "first resonance circuit") and a CL series resonance circuit (i.e., "second resonance circuit") are combined, and the secondary coil circuit 20 included in the VA comprises a series circuit topology composed of the secondary coil and a capacitor.

The primary-side LC/CL circuit topology and the secondary-side series circuit topology of the WPT system 100 will be described in more detail as follows.

When viewed from the input side where the power source is located, the primary coil circuit 10 may include the first resonance circuit comprising a first inductor $L_{in}$ connected in series with the primary coil 11 and a first capacitor ($C_P$) connected in parallel with the primary coil 11. The first capacitor $C_P$ may be referred to as a compensation capacitor or a first compensation capacitor.

Also, the primary coil circuit 10 may further include an auxiliary filter 12 connected between a connection node between the first inductor $L_{in}$ and the first capacitor $C_P$ and one end of the primary coil 11. The auxiliary filter 12 may include at least one capacitor connected in series with the primary coil 11. Here, the at least one capacitor may be referred to as a second capacitor, a filter capacitor, or a second compensation capacitor, in which case the second capacitor and the primary coil 11 may form the second resonance circuit.

Also, the primary coil circuit 10 may further include a first resistor R1 between the auxiliary filter 12 and the primary coil 11. The first resistor R1 may be referred to as a coil resistance or a primary-side load resistor, and may include a wire resistance of the primary coil 11 or a separate resistance element.

The above-described primary coil 11 may correspond to a second inductor and the magnetic inductance of the primary coil 11 may be represented by $-j \cdot L1$ which is 90 degrees different from a phase of an input current with respect to the phase of the input current.

According to the configuration of the primary coil circuit 10 described above, it is possible to reduce the primary coil current while suppressing the bifurcation phenomenon under the light-load of the existing WPT system using the SS or SP circuit topology. That is, when the secondary coil circuit 20 has a series circuit topology of the secondary coil 21 and the compensation capacitor $C_S$, the primary coil circuit 10 may operate to resonate with the secondary-side series resonance circuit of the secondary coil circuit 20 through the double resonant circuit in which the first resonance circuit and the second resonance circuit are combined, so that the output voltage of the WPT system 100 may become naturally a constant voltage output. The constant voltage output in the WPT system 100 is adequate for battery charging.

As described above, according to the primary coil circuit 10, by disposing the capacitive auxiliary filter 12 connected in series with the primary coil 11 between the compensation capacitor $C_P$ and the primary coil 11, the primary-side coil current may be reduced to a reasonable value while effectively preventing the bifurcation phenomenon under the light-load, which may occur when only a primary-side parallel circuit topology or only a primary-side series circuit topology is used.

Also, the secondary coil circuit 20 may include the secondary coil 21 and the third capacitor $C_S$ connected in series with the secondary coil 21. The second resistor R2 may be connected in series between the secondary coil 21 and the third capacitor $C_S$. Here, the secondary coil 21 may be referred to as a third inductor having a third inductance, and the magnetic inductance of the secondary coil 21 may be expressed as jωL2 similarly to the magnetic inductance of the primary coil 11. Also, the third capacitor $C_S$ may be referred to as a third compensation capacitor or a secondary-side compensation capacitor.

Meanwhile, in the WPT system 100 described above, the auxiliary filter 12 may further include a capacitor other than the second capacitor, and may further include a switching element connected in series to the second capacitor or other capacitor. The switching element may be turned on or off by a signal S1 given by the GA controller 50.

Also, in the WPT system 100 described above, the power conversion unit 30 may include an inverter, a filter, an impedance matching network (IMN), etc., and the power pick-up unit 40 may include an IMN, a rectifier having a filter functionality, an impedance converter to which an electric load is connected, and the like. Also, in wireless power transfer, the VA controller 60 may perform command and control communications and/or high level communications with the GA controller 50 via a wireless communication link.

An operation procedure of the wireless power transfer system 100 will be described as follows.

First, a current to be charged in the battery may be determined by the VA.

Then, a power request may be communicated from the VA controller 60 to the GA controller 50 over a wireless communication channel.

Then, the GA controller 50 may acknowledge the power request, receive power (referred to as external power) from the grid containing the power source, convert the external power into a high frequency AC through an AC-DC converter, a DC-DC converter, an inverter, or their combination, and transfer it to the primary coil circuit 10.

Then, the AC of a predetermined high frequency may be induced in the secondary coil 21 by magnetic coupling between the primary coil 11 and the secondary coil 21, rectified in the power pick-up unit 40, and charged in an electric load, for example, a battery.

Before the battery (e.g., high-voltage battery) of the vehicle is fully charged, the battery normally performs the charging operation at a low speed or a low voltage charging from a predetermined charging amount to a full charge. In the WPT system of the existing technology, there is a problem that the bifurcation phenomenon occurs, the performance of the system is deteriorated, and the reliability of the system is lowered. However, in embodiments of the present disclosure, the problem of such bifurcation phenomenon is solved by applying a new circuit topology, and the system design may be efficiently performed by reducing the primary coil current.

The aforementioned wireless power transfer or wireless charging process may continue until the battery of the electric vehicle is sufficiently charged, and the VA controller 60 may deliver to the GA controller 50 a power transmission stop request or other power level request indicating that there is no more power needed.

Figure 9:
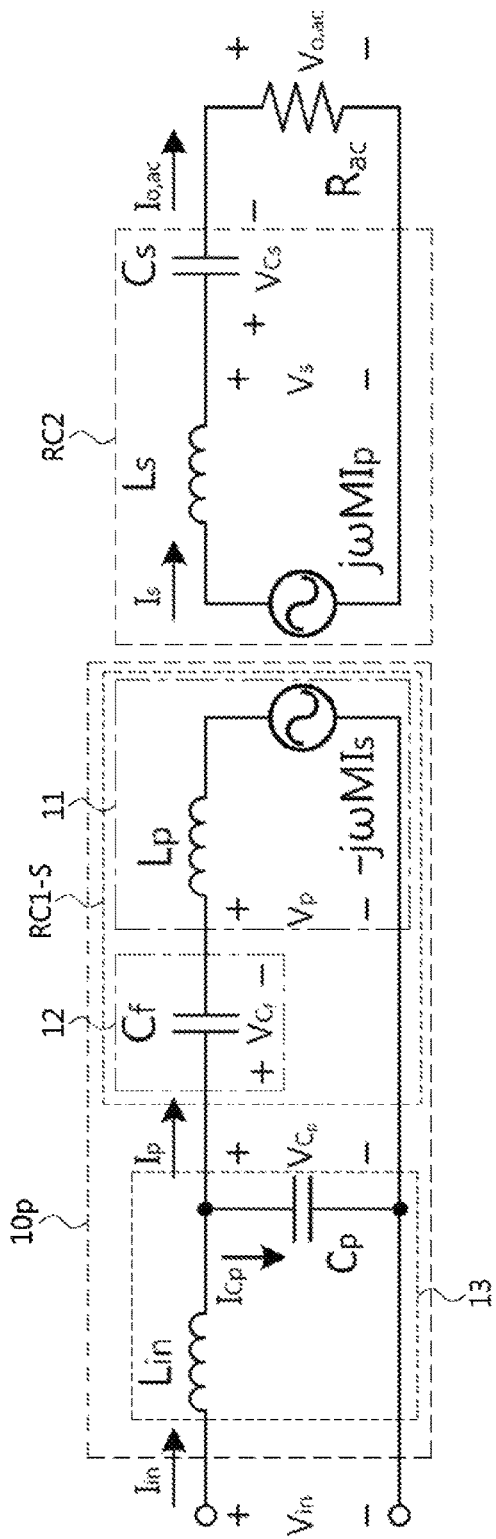
FIG. 9 is a circuit diagram illustrating a circuit topology applicable to the WPT system of FIG. 8.

FIG. 9 is a circuit diagram illustrating a circuit topology applicable to the WPT system of FIG. 8.

As shown in FIG. 9, a resonance circuit topology applied to the WPT system according to embodiments of the present disclosure may include a primary-side LC/CL structure and a secondary-side series structure.

The primary coil circuit $10_P$ to which the primary-side LC/CL circuit topology is applied may include a first inductor $L_{in}$ whose one end is connected to a high-potential terminal (i.e., "first input terminal") from the power source $V_S$, and a first capacitor $C_P$ having one end connected to a low-potential terminal (i.e., "second input terminal") from the power source $V_S$ and the other end connected to the other end of the first inductor $L_{in}$. The first inductor $L_{in}$ and the first capacitor $C_P$ may form a parallel resonance circuit (e.g., RC1-P) or a first resonance circuit 13 in which the first capacitor $C_P$ is connected in parallel to the primary coil.

Here, the both-end voltage of the input terminals is represented by $V_{in}$, the input current is represented by $I_{in}$, and the both-end voltage of the first capacitor $C_P$ may be represented by $V_{C_p}$. Also, the first capacitor $C_P$ may be referred to as a compensation capacitor, and the connection point of the first inductor $L_{in}$ and the first capacitor $C_P$ may be referred to as a first node. Also, $L_{in}$ denotes the inductance of the first inductor, but it may refer to the first inductor itself, and similarly, $C_P$ represents the capacitance of the first capacitor, but is not limited thereto and represents the first capacitor itself.

The primary coil circuit $10_P$ may include a second capacitor $C_f$ having one end connected to the first node and the other end connected to one end of the second inductor $L_P$ corresponding to the primary coil 11. The second capacitor $C_f$ and the primary coil may form a series resonance circuit RC1-S or the second resonance circuit (denoted as 11 and 12).

Here, the input current $I_{in}$ may be divided into a current $I_{C_P}$ flowing from the first node to the first capacitor $C_P$ and a current $I_P$ flowing to the second capacitor $C_f$. The second capacitor $C_f$ may be referred to as a filter capacitor, and the voltage across it may be represented by $V_{C_f}$. The voltage across the primary coil 11 or the secondary inductor $L_P$ corresponding to the primary coil may be represented by $V_P$.

Next, the secondary coil circuit 20 corresponding to the primary coil circuit 10 described above may have a circuit topology in which the secondary coil and the secondary-side compensation capacitor $C_S$ are connected in series. The secondary coil and the secondary-side compensation capacitor $C_S$ may form a series resonance circuit. The secondary coil may correspond to the third inductor $L_S$ and the secondary-side compensation capacitor $C_S$ may be referred to as the third capacitor.

In the secondary coil circuit 20, one end of the capacitor $C_S$ is connected to one end of the third inductor $L_S$ and the other end of the capacitor $C_S$ is connected to one end of the electric load $R_{ac}$ or $R_{o,ac}$.

Here, the secondary voltage induced in the secondary coil is represented by $V_S$, and the secondary current flowing through the secondary coil is represented by $I_S$. The voltage across the third capacitor $C_S$ is represented by $V_{CS}$, the output current supplied to the electric load is represented by $I_{o,ac}$, and the voltage across the electric load is represented by $V_{o,ac}$. The load may include the high voltage battery of the EV.

In the magnetic coupling state of the primary coil $L_P$ and the secondary coil $L_S$, the first magnetic inductance of the primary coil may be expressed as $-j\omega MI_S$ and the second magnetic inductance of the secondary coil may be expressed as $j\omega MI_P$.

The above-described primary coil circuit $10_P$ may be formed as a primary pad of the WPT system. Depending on the implementation, the primary pad may include only the primary coil 11 of the elements of the primary coil circuit $10_P$, and the remaining elements may be placed outside the primary pad, e.g., within the power conversion unit.

Figure 7:
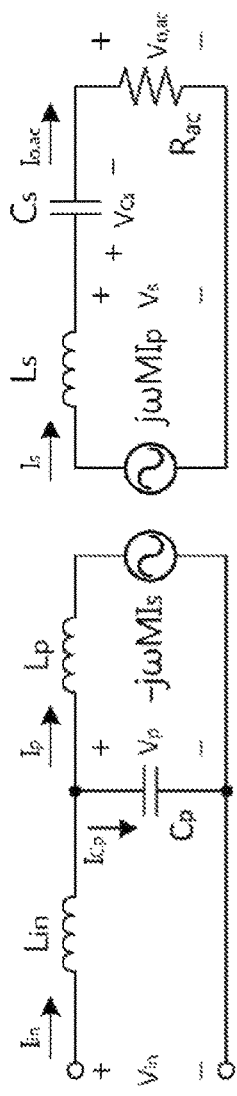
FIG. 7 is a partial circuit diagram of a WPT system having a circuit topology of LCL-S structure according to yet another comparative example.

In order to take advantage of the characteristics (e.g., bifurcation phenomenon suppression) of the LCL structure (e.g., see FIG. 7) of the comparative example, the input inductance $L_{in}$, the magnetic inductance of the primary coil $L_P$, the compensation capacitor $C_P$, and the filter capacitor $C_f$ may be designed as follows.

Assuming that the first resonance frequency of the first resonance circuit in the primary coil circuit of the WPT system is equal to the second resonance frequency of the second resonance circuit, Equation 1 may be expressed as follows.

$$\omega_0 = \frac{1}{\sqrt{L_{in}C_p}} = \frac{1}{\sqrt{L_s C_s}} \qquad \text{[Equation 1]}$$

Then, in the equation 1, the phase difference is ignored and the form of the reactance is rearranged to obtain Equation 2 below.

$$j\omega_0 L_{in} = j\omega_0 L_p + \frac{1}{j\omega_0 C_f} \qquad \text{[Equation 2]}$$

Then, Equation 2 is summarized by the relationship between the inductance $L_{in}$ of the first inductor and the magnetic inductance $L_P$ of the primary coil as expressed in Equation 3 below.

$$L_{in} = \left(\frac{C_f}{C_f + C_p}\right)L_p \qquad \text{[Equation 3]}$$

Since a value obtained by dividing the second capacitance $C_f$ by a sum of the first capacitance $C_P$ of the compensation capacitor and the second capacitance $C_f$ of the filter capacitor is less than 1, the inductance $L_P$ of the primary coil in the WPT system according to the present embodiment may have a larger value than the inductance of the primary coil of an existing WPT system using the SS, SP, or LCL circuit topology. For reference, in an existing WPT system, the inductance of the primary coil is substantially equal to the inductance of the first inductor.

The output voltages $V_{o,ac}$ of the WPT system according to the present embodiment may exhibit constant voltage characteristics as shown in Equation 4 below.

$$V_{o,ac} = \frac{MV_{in}}{L_{in}} \qquad \text{[Equation 4]}$$

Here, M represents the mutual inductance between the primary coil and the secondary coil.

Meanwhile, when comparing the circuit topology of LCL-LCL most similar to the present embodiment among the circuit topologies used in the conventional WPT system, the WPT system having the LCL-LCL structure of the comparative example may be expressed as Equation 5 below. Through Equation 5, it can be seen that the output current $I_{o,ac}$ exhibits constant current characteristics.

$$I_{o,ac} = -j\frac{MV_{in}}{\omega_o L_p L_s} \qquad \text{[Equation 5]}$$

Here, the LCL-LCL structure of the comparative example may correspond to a structure in which a capacitor connected in series to the primary coil and a capacitor connected in series to the secondary coil are respectively replaced with inductors in a SP-SP structure, which is one of the general circuit topologies of the WPT system shown in FIG. 17. Also, the primary-side LCL structure of the comparative example corresponds to the primary-side of the WPT circuit topology of FIG. 7.

As described above, the WPT system according to embodiments of the present disclosure is a modification of the LCL-S structure of the comparative example (e.g., see FIG. 7) in which a filter capacitor $C_f$ connected in series with the primary coil is added between the primary coil and the primary-side compensation capacitor. Using the LC/CL-S structure, the inductance $L_P$ of the primary coil may be increased, thereby reducing the current flowing in the primary coil significantly as compared to the comparative example (LCL-S structure).

That is, unlike the WPT system of the comparative example using the LCL-S structure (e.g., see FIG. 7) or the LCL-LCL structure, the WPT system using the LC/CL-S according to the present embodiment does not cause bifurcation problems under light-load conditions of a specific system frequency or resonance frequency, and does not substantially increase the primary-side coil current as compared with the comparative example using the SS or SP topology. Also, the system according to embodiments of the present disclosure significantly reduces the primary coil current compared to the comparative example using the LCL-S or LCL-LCL circuit topology, thereby facilitating the design of the WPT system, enhancing the stability and reliability of the entire system, and improving the ease of control.

Figure 10:
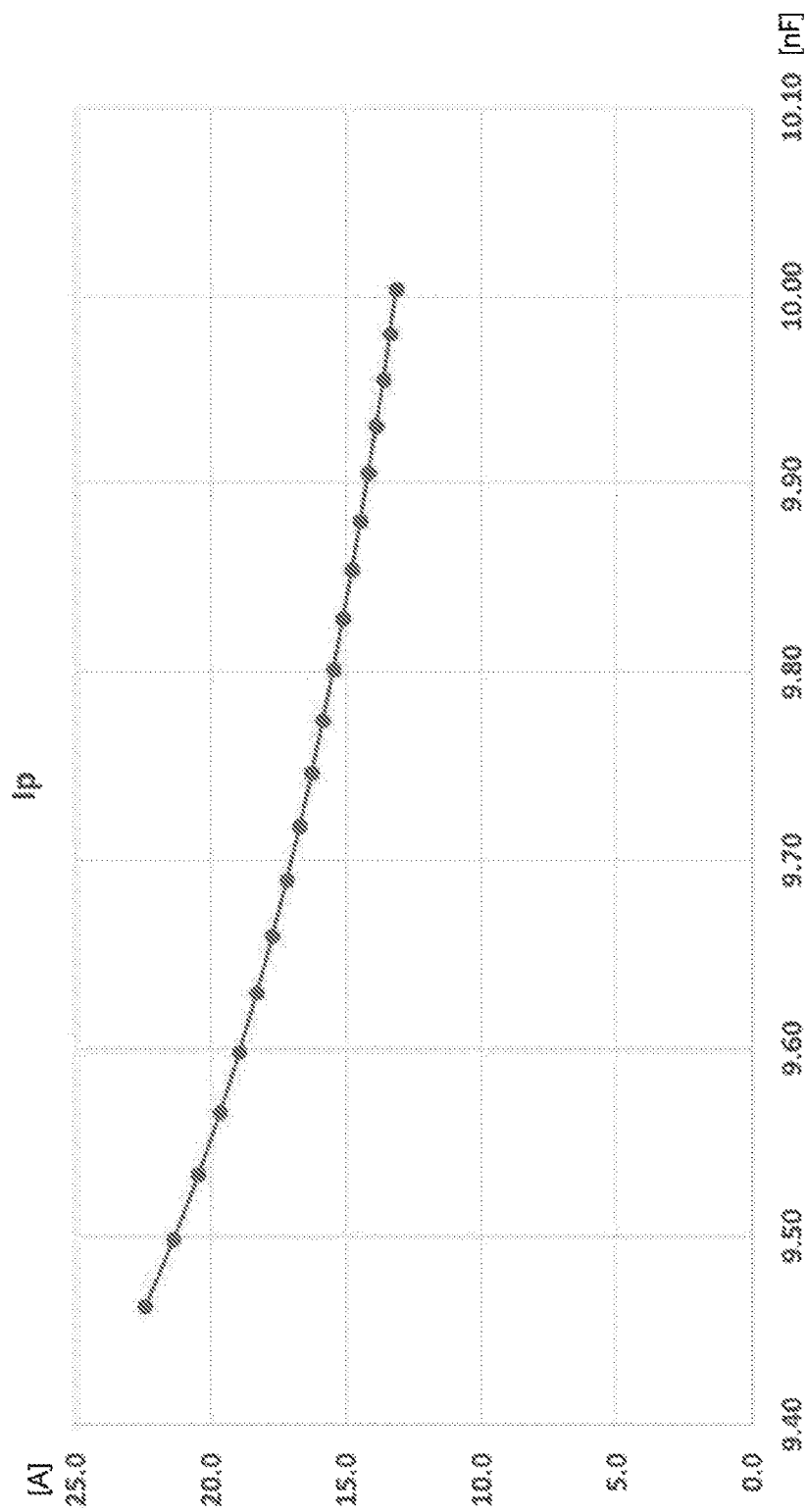
FIG. 10 is a graph illustrating a change in coil current stress due to a capacitance change of the filter capacitor in the primary coil circuit of the WPT system of FIG. 9.

FIG. 10 is a graph illustrating a change in coil current stress due to a capacitance change of the filter capacitor in the primary coil circuit of the WPT system of FIG. 9.

As illustrated in FIG. 10, when the capacitance $C_f$ of the filter capacitor included in the auxiliary filter of embodiments of the present disclosure is changed, the primary coil current $I_P$ linearly changes.

That is, when the capacitance $C_f$ of the filter capacitor changes from about 9.45 nF to about 10.00 nF, the primary coil current $I_P$ changes almost linearly from about 22.5 A to about 13.0 A.

Figure 11:
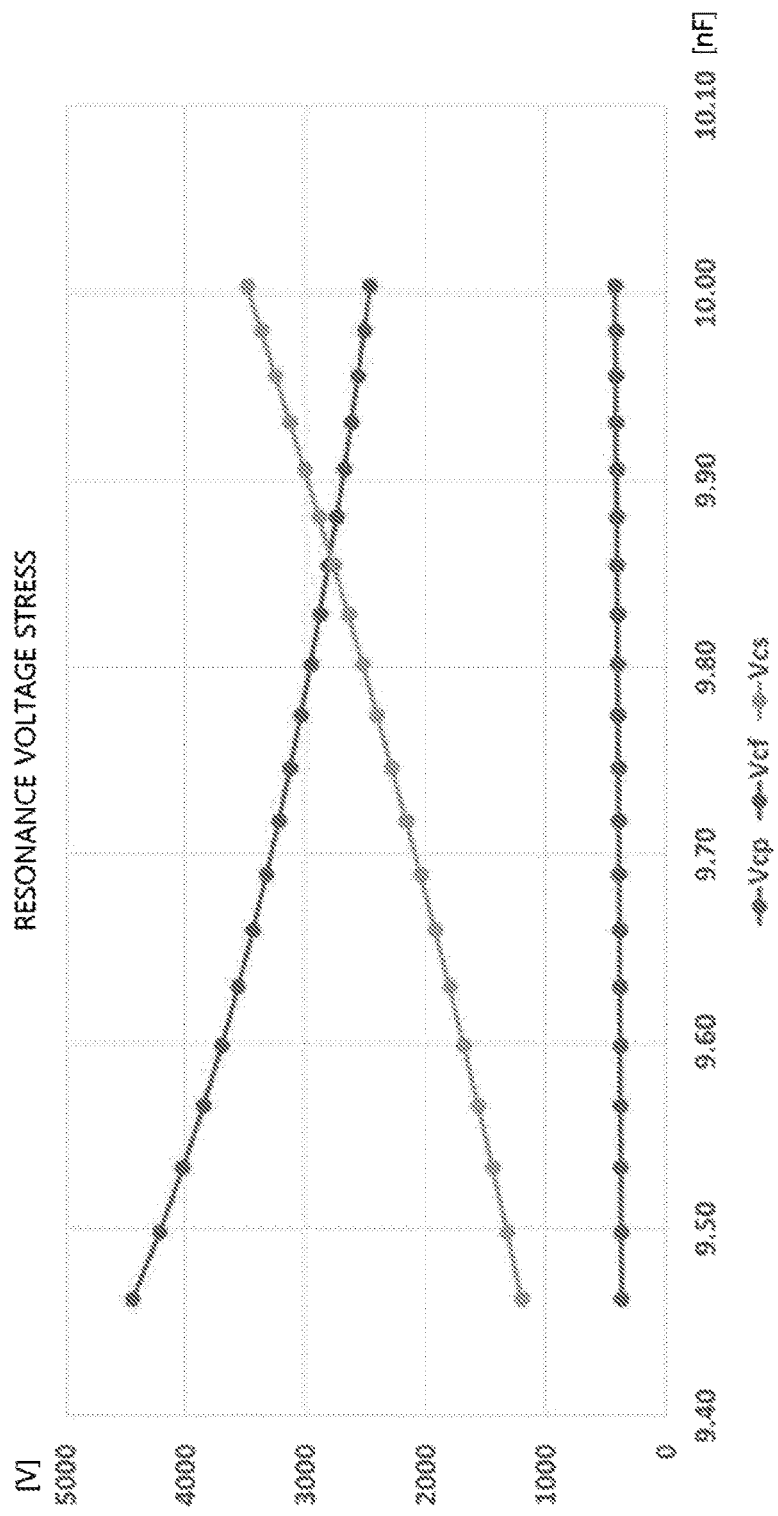
FIG. 11 is a graph illustrating changes in resonance voltage stress due to capacitance change of the filter capacitor in the primary coil circuit of the WPT system of FIG. 9.

FIG. 11 is a graph illustrating changes in resonance voltage stress due to capacitance change of the filter capacitor in the primary coil circuit of the WPT system of FIG. 9.

As illustrated in FIG. 11, when the capacitance $C_f$ of the filter capacitor included in the auxiliary filter of embodiments of the present disclosure is changed from about 9.45 nF to about 10.00 nF, the both-end voltage $V_{Cp}$ of the primary-side compensation capacitor is about 330V which is almost unchanged. However, the voltage across the filter capacitor $V_{Cf}$ decreases almost linearly from about 4400 V to about 2450 V and the voltage across the secondary-side capacitor $V_{Cs}$ increases substantially linearly from about 1180 V to about 3500 V.

As described above, according to embodiments of the present disclosure, the coil current $I_P$ and the resonance voltage stress may be adjusted according to the value of the filter capacitor $C_f$.

In the voltage and current of each part of the system in the resonance frequency atmosphere described above, the primary-side input current may be expressed by Equation 6 below, the primary-side compensating capacitor voltage may be expressed by Equation 7 below, and the primary-side filter capacitor voltage may be expressed by Equation 8 below, the primary-side winding current may be expressed by Equation 9 below, the secondary-side coil current may be expressed by Equation 10 below, the secondary-side compensation capacitor voltage may be expressed by Equation 11 below, and the output voltage may be expressed by Equation 12 below.

$$I_{in} = \left(\frac{M}{L_{in}}\right)^2 \frac{V_{in}}{R_{ac}} \quad \text{[Equation 6]}$$

$$V_{Cp} = V_{in} - j\frac{\omega_0 M^2 V_{in}}{R_{ac} L_{in}} \quad \text{[Equation 7]}$$

$$\left(1 - \frac{L_p}{L_{in}}\right) V_{in} \quad \text{[Equation 8]}$$

$$I_p = -j\frac{V_{in}}{\omega_o L_{in}} \quad \text{[Equation 9]}$$

$$I_s = I_{o,ac} = \frac{MV_{in}}{R_{ac} L_{in}} \quad \text{[Equation 10]}$$

$$V_{Cs} = -j\frac{\omega_0 L_s M V_{in}}{R_{ac} L_{in}} \quad \text{[Equation 11]}$$

$$|V_{o,ac}| = \quad \text{[Equation 12]}$$

$$\left| \frac{V_{in}}{Z_{in}} \cdot \left\{ \frac{1}{1 + j\omega C_p \left( j\omega L_p + \frac{1}{j\omega C_f} + Z_r \right)} \right\} \cdot \frac{j\omega M}{Z_{22}} \cdot R_{ac} \right|$$

Here, $Z_{in}$ represents the input impedance, $Z_r$ represents the reflection impedance, and $Z_{22}$ represents the impedance of the secondary-side resonance circuit.

Figure 12:
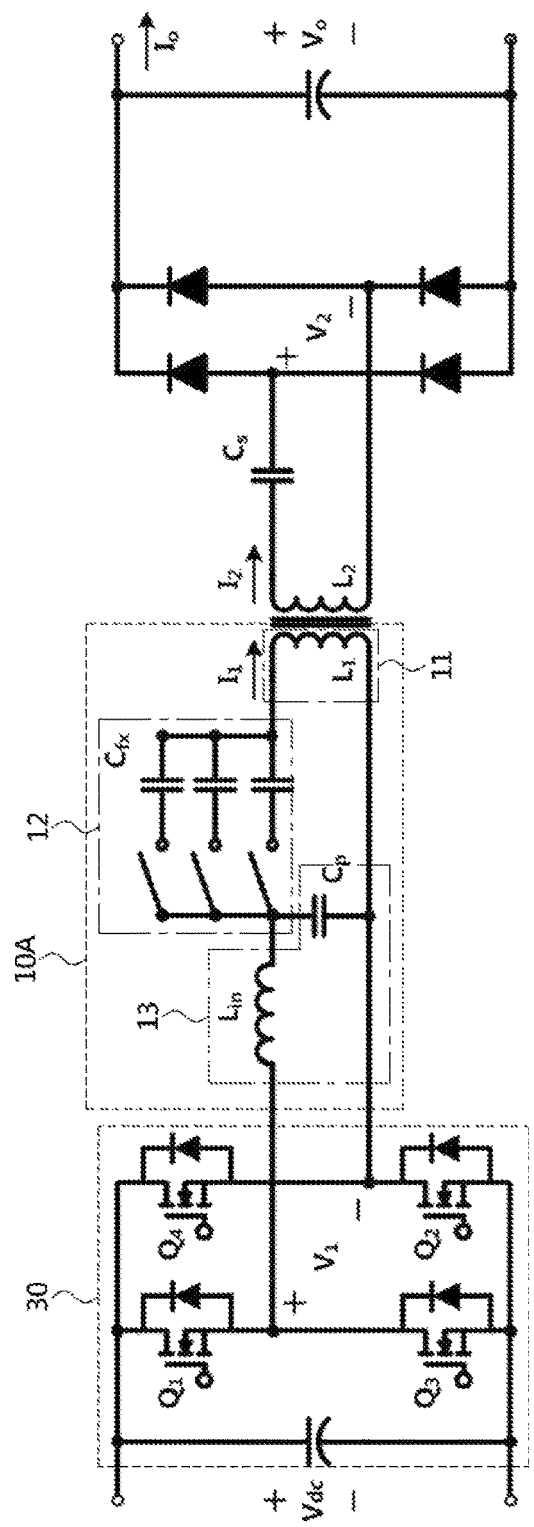
FIG. 12 is a partial circuit diagram of a WPT system to which a primary coil circuit according to embodiments of the present disclosure is applied.

FIG. 12 is a partial circuit diagram of a WPT system to which a primary coil circuit according to embodiments of the present disclosure is applied.

As shown in FIG. 12, the WPT system according to embodiments of the present disclosure may comprise a GA and a VA. The GA may include a primary coil circuit 10A and a power conversion unit 30. The VA may include a secondary coil $L_2$, a secondary-side compensation capacitor $C_S$, a rectifier, and a smoothing capacitor $C_O$.

More specifically, the primary coil circuit 10A may include a primary coil 11, an auxiliary filter 12, and a first resonance circuit 13. The primary coil 11 may correspond to the second inductor $L_1$. The coupling relationship of the primary coil 11, the auxiliary filter 12 and the first resonant circuit 13 is substantially the same as that illustrated in FIG. 8.

The auxiliary filter 12 may include at least one capacitor $C_{fx}$. The at least one capacitor $C_{fx}$ may be one or more. In addition, the auxiliary filter 12 may include at least one switching element $Q_x$ connected in series to the at least one capacitor $C_{fx}$. In the present embodiment, the at least one switching element $Q_x$ may include at least one switching element connected in series to the at least one capacitor $C_{fx}$, but is not limited thereto, and may be selectively connected to the at least one capacitor $C_{fx}$.

The configuration and function of the at least one capacitor $C_{fx}$ are substantially the same as those of the second capacitor $C_f$ illustrated in FIG. 8.

The at least one capacitor $C_{fx}$ may function as a redundancy element of the second capacitor $C_f$. Also, when the operating frequency is changed by tolerance or deterioration of the internal electronic components in the primary-side resonance circuit of the WPT system or the corresponding elements, or when the at least one capacitor $C_{fx}$ is coupled to the second resonance circuit by the operation of the at least one switching element $Q_x$, the at least one capacitor $C_{fx}$ may be used to control the operating frequency so that the operating frequency of the WPT system is equal to or close to a predetermined or desired system frequency or resonance frequency.

The first resonance circuit 13 may include a first inductor $L_{in}$ and a first capacitor $C_P$. The first inductor $L_{in}$ is connected in series to the primary coil 11 and the first capacitor $C_P$ is connected in parallel to the primary coil 11.

According to the above-described primary coil circuit 10A, the GA of the WPT system may suppress the occurrence of bifurcation under light-load and reduce the primary coil current $I_1$, and flexibly adjust the resonance frequency in response to the tolerance or deterioration of the elements in the primary coil circuit 10A. Further, according to the above-described primary coil circuit 10A, the capacitance of the auxiliary filter 12 may be actively adjusted in response to the variation of the electric load on the secondary-side or the fluctuation of the power source.

The power conversion unit 30 may include an inverter composed of first through fourth switching elements $Q_1$, $Q_2$, $Q_3$, and $Q_4$ each having a first terminal, a second terminal, and a control terminal. In addition, a predetermined input voltage $V_{dc}$ may be applied to input terminals of the power conversion unit 30. Also, an input capacitor $C_{in}$ may be connected in parallel between the input terminals.

In the inverter of the power conversion unit 30, the first terminal of the first switching element $Q_1$ is connected to the first input terminal of the power conversion unit 30, and the second terminal of the third switching element $Q_3$ is connected to the second input terminal of the power conversion unit 30. The second terminal of the first switching element $Q_1$ and the first terminal of the third switching element $Q_3$ are connected to the first input terminal of the primary coil circuit 10A.

Also, in the inverter, the first terminal of the fourth switching element $Q_4$ is connected to the first input terminal of the power conversion unit 30, and the second terminal of the second switching element $Q_2$ is connected to the second input terminal of the power conversion unit 30. The second terminal of the fourth switching element $Q_4$ and the first terminal of the second switching element $Q_2$ are connected to the second input terminal of the primary coil circuit 10A.

The switching elements of the power conversion unit 30 described above are independently turned on and off so that the power conversion unit 30 can output the current of the desired frequency to the primary coil circuit 10A. The controller of the power conversion unit 30 may be an independent controller, but is not limited thereto, and may be embodied as at least a part of the functions of the GA controller (see 50 in FIG. 8) or a component performing a corresponding function.

The operation of the WPT system will be described.

First, the input voltage $V_{dc}$ is applied to the input terminals connected to a grid or a power source. The input capacitor $C_{in}$ may be connected in parallel to both the input terminals. The inverter including four switching elements $Q_1$, $Q_2$, $Q_3$, and $Q_4$ may be coupled to the input terminals. The input capacitor $C_{in}$ and the inverter are included in the power conversion unit 30. The output voltage $V_1$ of the inverter or the power conversion unit 30 may be applied to the primary coil circuit 10A.

The four switching elements of the inverter may be controlled by a GA controller or equivalent logic controller. The ON or OFF operations of the switching elements of the inverter may be controlled by a pulse width modulation (PWM) method.

The first input terminal corresponding to a high-potential terminal of the primary coil circuit 10A and the second input terminal corresponding to the low-potential terminal of the primary coil circuit 10A are connected to the output terminals of the power conversion unit 30. A predetermined voltage $V_1$ is applied to the input terminals of the primary coil circuit 10A. Here, the predetermined voltage $V_1$ may be an AC high voltage as a voltage supplied to the primary coil. The high voltage, as a voltage supplied to the primary-side resonance circuit, may have a relatively high level relative to other voltages in the WPT system and may be a nominal voltage specified by regulation or standard for the wireless power transfer.

In the operating environment of the WPT system, the first resonance circuit 13 of the primary coil circuit 10A may resonate at a first resonance frequency, and the second resonance circuit (denoted as 11 and 12) may resonate at a second resonant frequency. The first resonance frequency and the second resonance frequency may be substantially the same. Also, the first resonance frequency and the second resonance frequency may be different from each other due to tolerance or deterioration of the elements in the state where the manufacture or assembly of the primary coil circuit 10A is completed. In this case, the VA controller may operate by matching the operating frequency of the WPT system to either the first resonance frequency or the second resonance frequency, or the system frequency. The other one of the first resonance frequency and the second resonance frequency may not be coincident with the system frequency or the operating frequency but may be close to the system frequency or the operating frequency.

In the magnetic coupling state between the primary coil $L_1$ and the secondary coil $L_2$ of the WPT system, the primary power generated in the primary coil $L_1$ through which the primary coil current $I_1$ flows is transferred to the secondary coil $L_2$ through the atmosphere. The secondary current $I_2$ due to the electromotive force induced in the secondary coil $L_2$ is converted through the series resonance circuit of the secondary coil $L_2$ and the secondary-side compensation capacitor $C_S$ (the converted voltage is $V_2$), and output through the rectifier. The rectifier may comprise four diodes or means or elements (e.g., diode transistors) that perform functions corresponding to these diodes. The output voltage $V_O$ and the output current $I_O$ may be supplied to the external (i.e., electric load or battery) through the output terminal of the WPT system connected to the output terminal of the rectifier. A smoothing capacitor $C_O$ may be connected in parallel at the output stage. The smoothing capacitor $C_O$ may convert the pulsating current generated by the rectifier into a DC having a relatively small ripple.

Then, in the VA, the secondary coil $L_2$ generates the secondary-side coil current $I_2$ by induced electromotive force. Here, the secondary-side compensation capacitor $C_S$ connected in series to the secondary coil $L_2$ and the secondary coil $L_2$ forms a secondary-side series resonance circuit. The output terminal of the secondary-side serial resonance circuit may be connected to the input terminal of the rectifier at a predetermined voltage level $V_2$. Also, the output of the rectifier may be supplied to the high-voltage battery of the electric vehicle or the like in the form of a voltage $V_O$ of a predetermined level and a current $I_O$ of a predetermined level via the smoothing capacitor $C_O$. The smoothing capacitor $C_O$ may be referred to as a filter.

Also, depending on the implementation, the VA may further comprise a constant voltage regulator or a separate converter at the rear end of the rectifier or filter.

The primary coil 11 described above may be prepared as included in the primary pad. In this case, the primary pad may include means for assisting magnetic induction of the primary coil 11 or means for supporting or protecting the primary coil. Similarly, the secondary coil may be prepared as included in the secondary pad. In this case, the secondary pad may also include means for assisting magnetic induction of the secondary coil or means for supporting or protecting the secondary coil.

According to embodiments of the present disclosure, the power conversion unit 30 may receive a commercial power of a grid, a power supplied from a predetermined power source, or a DC converted from the power, convert the direct current to alternating current through a phase shift full bridge type inverter, and supply the converted AC to the primary coil circuit 10A. The primary coil circuit 10A may operate to induce an electromotive force in the secondary coil magnetically coupled to the primary coil 11 and to cause a secondary coil current I2 to flow through the secondary coil. When the power is received from the primary coil circuit by the series resonance circuit of the secondary coil and the secondary-side compensation capacitor, the VA may rectify and smoothly output the AC voltage induced in the secondary-side series resonance circuit. Then, the battery may be charged with the constant voltage $V_O$ at the resonance frequency.

Figure 13:
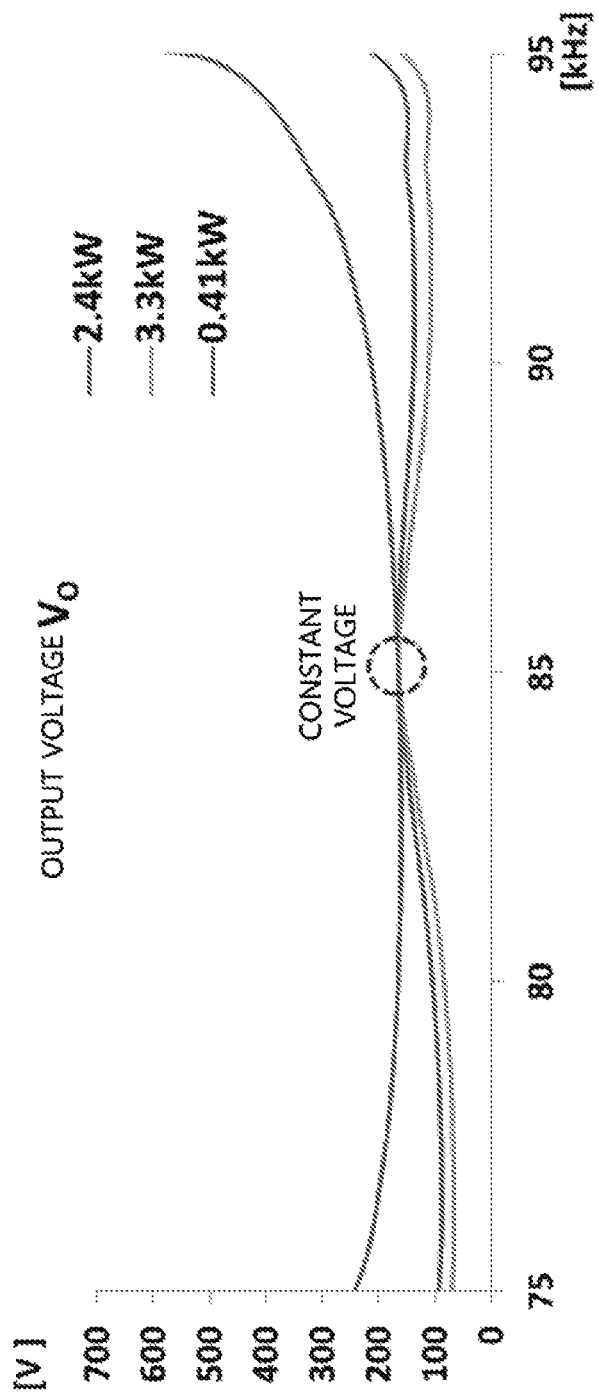
FIG. 13 is a graph illustrating an output voltage change with respect to a frequency change of the WPT system according to embodiments of the present disclosure.

FIG. 13 is a graph illustrating an output voltage change with respect to a frequency change of the WPT system according to embodiments of the present disclosure.

As illustrated in FIG. 13, the WPT system according to embodiments of the present disclosure exhibits a constant voltage characteristic of about 200 V at a resonance frequency of 85 kHz and a frequency close thereto, under conditions of 3.3 kW for a rated load, 2.4 kW for an intermediate load, and 0.41 kW for a light-load.

Figure 5:
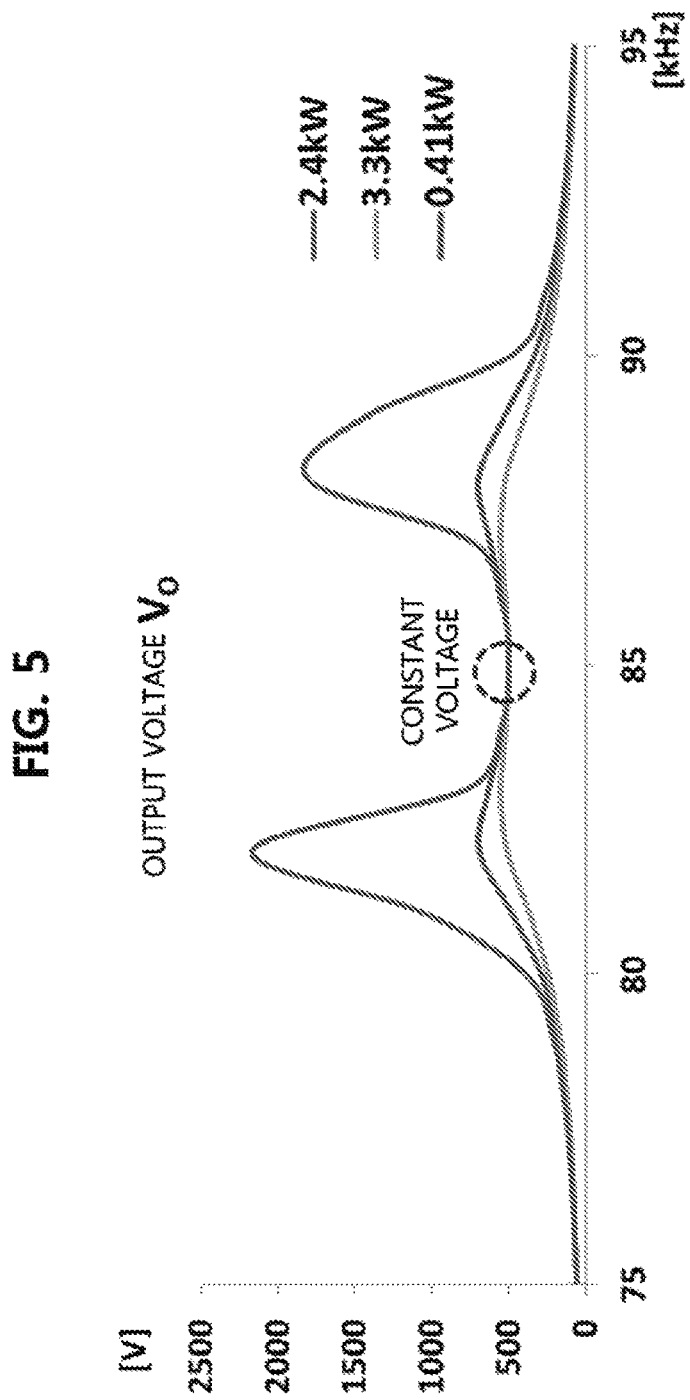
FIG. 5 is a graph illustrating changes in output voltage according to a frequency change of the WPT system of FIG. 4.
Figure 6:
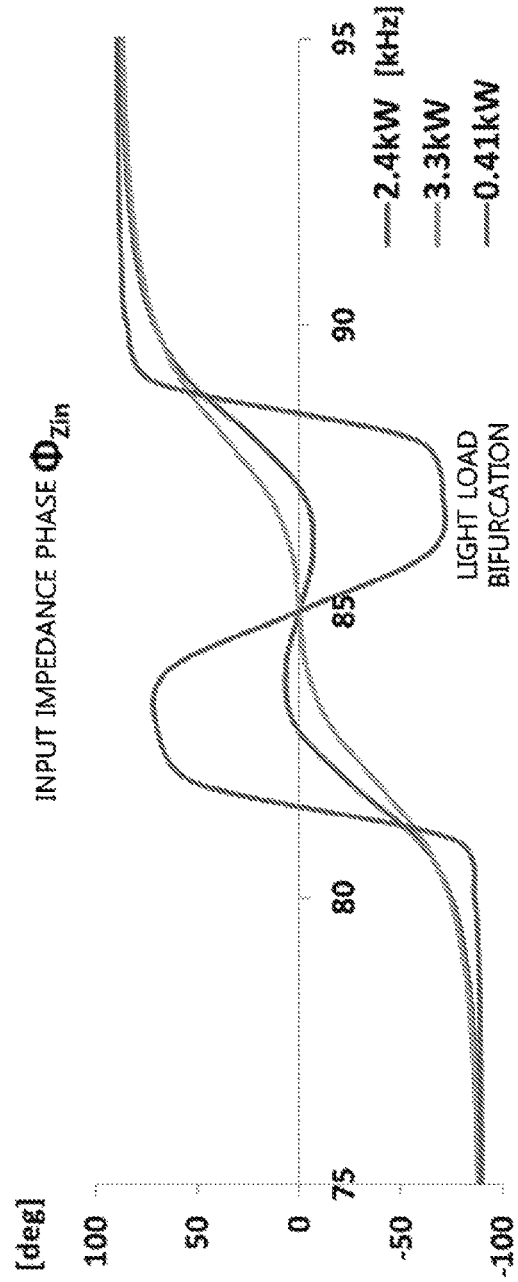
FIG. 6 is a graph illustrating changes in a phase of input impedance according to a frequency change of the WPT system of FIG. 4.

In addition, while the system frequency is changed from about 75 kHz to about 92 kHz, the output voltage $V_O$ is kept substantially stable with almost no abrupt change or bifurcation as in the comparative example (e.g., see FIG. 5).

Figure 14:
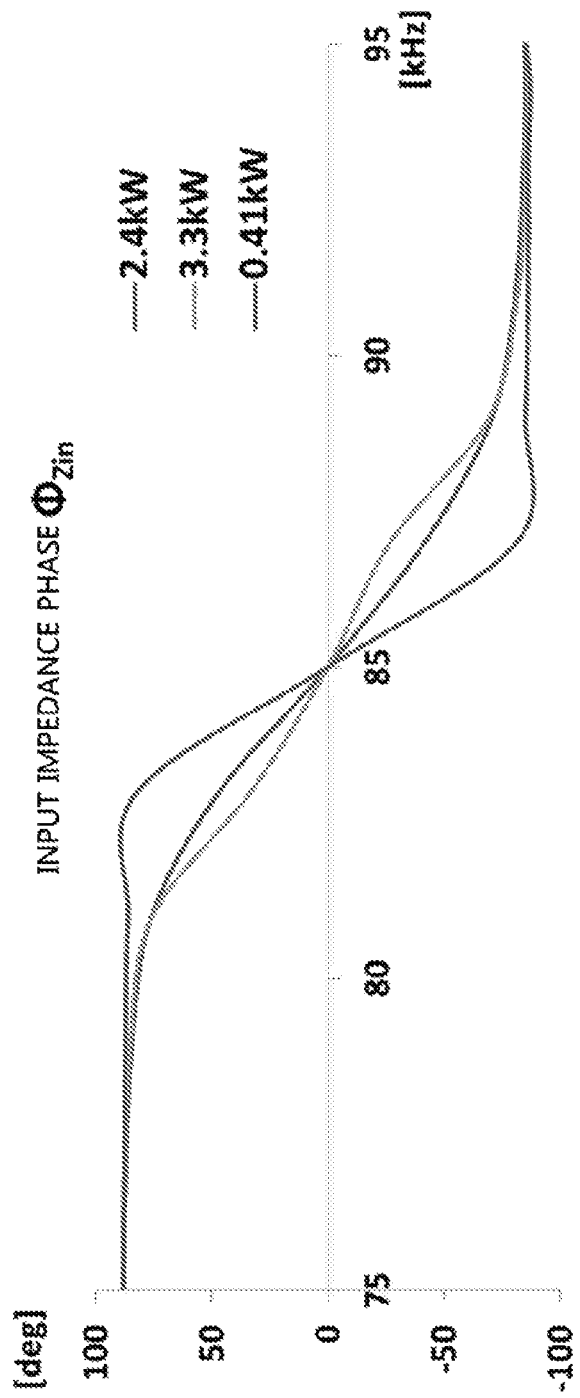
FIG. 14 is a graph illustrating changes in a phase of input impedance with respect to a frequency change of the WPT system according to embodiments of the present disclosure.

FIG. 14 is a graph illustrating changes in a phase of input impedance with respect to a frequency change of the WPT system according to embodiments of the present disclosure.

The graph shown in FIG. 14 illustrates characteristics of a 3.3 kW WPT system designed at 85 kHz based on the resonance network topology (LC/CL-S) proposed in the present disclosure.

As illustrated in FIG. 14, in the WPT system according to embodiments of the present disclosure, the phase $\Phi_{Zin}$ of the input impedance at lower frequencies including the frequency lower than the resonance frequency is stably positioned in the positive region, and the phase of the input impedance at higher frequencies including the frequency higher than the resonance frequency is stably located in the negative region, under conditions of 3.3 kW for a rated load, 2.4 kW for an intermediate load, and 0.41 kW for a light-load.

By designing the WPT system using the LC/CL-S circuit topology, it is made possible to effectively obtain the constant voltage output characteristic in the WPT, and to stability maintain the phase of the input impedance without bifurcation phenomenon even under light-load (for example, 0.41 kW). The reason is that the value of the first capacitor $C_P$ of the first resonance circuit in the LC/CL-S topology is designed to be relatively large.

Figure 15:
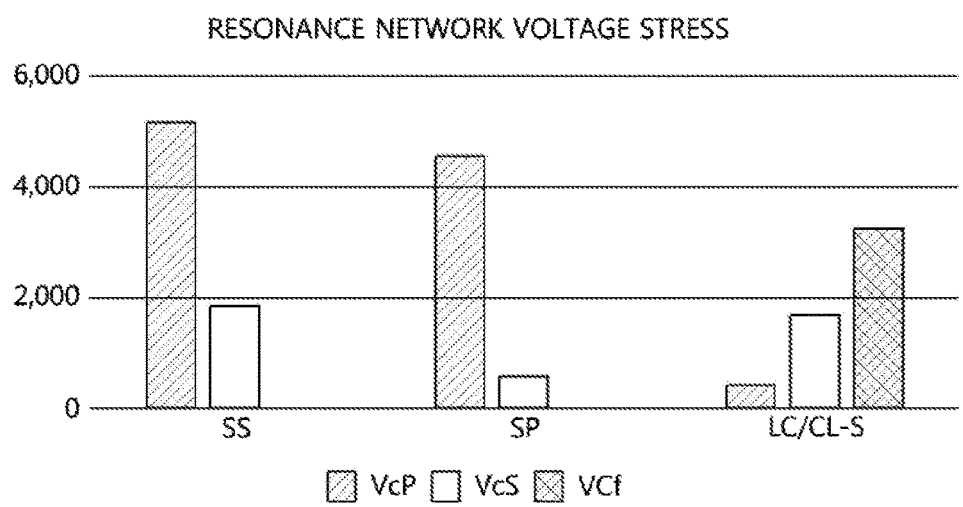
FIG. 15 is a graph illustrating a comparison of the resonance network voltage stress of the comparative example and that of the WPT system according to embodiments of the present disclosure.

FIG. 15 is a graph illustrating a comparison of the resonance network voltage stress of the comparative example and that of the WPT system according to embodiments of the present disclosure. Also, FIG. 16 is a graph illustrating a comparison of the resonance network current stress of the comparative example and that of the WPT system according to embodiments of the present disclosure.

As illustrated in FIG. 15, the resonance network voltage stresses for the present embodiment (LC/CL-S) and the two comparative examples (SS and SP) are compared. That is, it can be seen that the current stress in embodiments of the present disclosure is distributed relatively evenly as compared with the prior arts.

Figure 16:
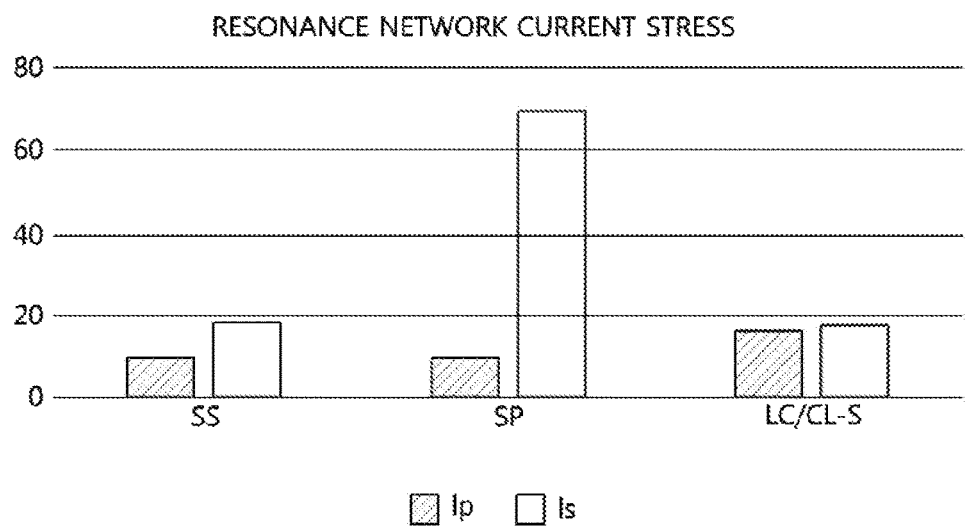
FIG. 16 is a graph illustrating a comparison of the resonance network current stress of the comparative example and that of the WPT system according to embodiments of the present disclosure.

Similarly, as shown in FIG. 16, the resonance network current stresses for the present embodiment (LC/CL-S) and the two comparative examples (SS and SP) are compared. In other words, it can be seen that the current stress in embodiments of the present disclosure is distributed relatively evenly as compared with the related art.

While the embodiments of the present disclosure and their advantages have been described in detail, it should be understood that various changes, substitutions and alterations may be made herein without departing from the scope of the disclosure.

What is claimed is:

1. A primary coil circuit of a ground assembly for wirelessly transferring power to a secondary coil, the primary coil circuit comprising:
a primary coil magnetically coupled to the secondary coil and having a first terminal and a second terminal;
a second capacitor having a first terminal and a second terminal connected to the first terminal of the primary coil;
a first inductor having a first terminal coupled to a first input terminal of a power source and a second terminal coupled to the first terminal of the second capacitor; and
a first capacitor having a first terminal coupled commonly to the second terminal of the first inductor and the first terminal of the second capacitor and a second terminal coupled commonly to the second terminal of the primary coil and a second input terminal of the power source,
wherein a first inductance of the first inductor is smaller than a second inductance of the primary coil, and the first inductance is calculated by multiplying the second inductance of the primary coil and a value obtained by dividing a second capacitance of the second capacitor by a sum of a first capacitance of the first capacitor and the second capacitance of the second capacitor.

2. The primary coil circuit according to claim 1, wherein the second capacitance of the second capacitor is determined by a target current supplied to the primary coil.

3. The primary coil circuit according to claim 1, wherein a phase of a current flowing through the primary coil is 90 degrees different from a phase of a current flowing through the first inductor.

4. The primary coil circuit according to claim 1, wherein a first resonance frequency of a first resonance circuit formed by the first inductor and the first capacitor is equal to a second resonance frequency of a second resonance circuit formed by the primary coil and the second capacitor.

5. The primary coil circuit according to claim 1, further comprising at least one third capacitor connected in parallel to the second capacitor.

6. The primary coil circuit according to claim 5, further comprising at least one switching element connected in series to the at least one third capacitor or the second capacitor,
wherein the at least one switching element is turned on or off by a ground assembly controller connected to the at least one switching element.

7. A ground assembly for wirelessly transferring power to a secondary coil, the ground assembly comprising:
a primary coil magnetically coupled to the secondary coil and having a series resonance circuit;
a second capacitor connected in series with the primary coil;
a parallel resonance circuit coupled to the series resonance circuit of the primary coil and the second capacitor and having a first inductor and a first capacitor;
at least one third capacitor connected in parallel to the second capacitor;
at least one switching element connected in series to the at least one third capacitor or the second capacitor; and
a controller controlling an ON or OFF operation of the at least one switching element.

8. The ground assembly according to claim 7, further comprising a power conversion unit which is coupled to the parallel resonance circuit, converts a power from a power source, and transfers the converted power to the parallel resonance circuit.

9. The ground assembly according to claim 8, further comprising a controller controlling a system frequency applied to the parallel resonance circuit by controlling operation of at least one switching element in the power conversion unit.

10. The ground assembly according to claim 9, wherein the controller controls the system frequency so that a first resonance frequency of the parallel resonance circuit is equal to a second resonance frequency of the series resonance circuit.

11. The ground assembly according to claim 9, wherein the controller controls an operating frequency according to element tolerance or an element deterioration of one or more of the primary coil, the second capacitor, the first capacitor, and the first inductor, such that the operating frequency matches or approximates the system frequency, a resonance frequency of the parallel resonance circuit, or a resonance frequency of the series resonance circuit.

12. A method of manufacturing a ground assembly for wirelessly transferring power to a secondary coil, comprising:

forming a primary coil circuit; and connecting a power conversion unit converting a power from a power source and transferring the converted power to the primary coil circuit, wherein the primary coil circuit includes:

a primary coil magnetically coupled to the secondary coil and having a first terminal and a second terminal;

a second capacitor having a first terminal and a second terminal connected to the first terminal of the primary coil;

a first inductor having a first terminal coupled to a first input terminal of the power source and a second terminal coupled to the first terminal of the second capacitor; and a first capacitor having a first terminal coupled commonly to the second terminal of the first inductor and the first terminal of the second capacitor and a second terminal coupled commonly to the second terminal of the primary coil and a second input terminal of the power source, and a capacitance of the second capacitor is determined based on a target current applied to the primary coil, wherein a first inductance of the first inductor is smaller than a second inductance of the primary coil, and the first inductance is calculated by multiplying the second inductance of the primary coil and a value obtained by dividing a second capacitance of the second capacitor by a sum of a first capacitance of the first capacitor and the second capacitance of the second capacitor.

13. The method according to claim 12, wherein a first resonance frequency of a first resonance circuit formed by the first inductor and the first capacitor is equal to a second resonance frequency of a second resonance circuit formed by the primary coil and the second capacitor.

14. The method according to claim 12, wherein the primary coil circuit further comprises:

at least one third capacitor connected in parallel to the second capacitor; and at least one switching element connected in series to the at least one third capacitor or the second capacitor, wherein the at least one switching element is turned on or off by a ground assembly controller connected to the at least one switching element.

15. The method according to claim 12, wherein the forming the primary coil circuit comprises:

forming a primary pad including the primary coil and ferrite supporting the primary coil.

* * * * *